United States Patent [19]

Talley, III et al.

[11] Patent Number: 4,913,454
[45] Date of Patent: Apr. 3, 1990

[54] HOISTING AND TOWING BRACKET FOR VEHICLE

[75] Inventors: Walter D. Talley, III, Mount Clemens; John A. DiGasbarro, Rochester Hills, both of Mich.

[73] Assignee: Chrysler Corporation, Highland Park, Mich.

[21] Appl. No.: 354,667

[22] Filed: May 22, 1989

[51] Int. Cl.⁴ .............................................. B62D 53/04
[52] U.S. Cl. .................................... 280/402; 280/480; 414/563
[58] Field of Search ............... 280/402, 480, 495, 497; 414/563

[56] References Cited

U.S. PATENT DOCUMENTS 2,380,523 7/1945 Hicks et al.
4,527,812 7/1985 McFadden .......................... 280/402
4,616,970 10/1986 Lewis ................... 414/563
4,620,736 11/1986 Shanks .

Primary Examiner—Charles A. Marmor
Assistant Examiner—Mitchell Bompey
Attorney, Agent, or Firm—Edward P. Barthel

[57] ABSTRACT

A novel one-piece hoisting and towing bracket adapted for mounting on a vehicle frame cross member. A unitary generally U-shaped bracket is formed from sheet metal providing a bridge portion interconnecting first and second upright mirror image leg portions each having a double-L-shaped cross section. The bridge portion has a forwardly extending, horizontally positioned plate portion bent therefrom provided with holes receiving self-tapping bolts which extend through associated aligned apertures in the bottom wall of the cross member. Each leg portion upper end has a forwardly offset locking blade adapted to initially project through an associated horizontal slot in the side wall of the cross member whereby threading the bolts into their aligned apertures fixedly secures the bracket on the vehicle.

2 Claims, 4 Drawing Sheets

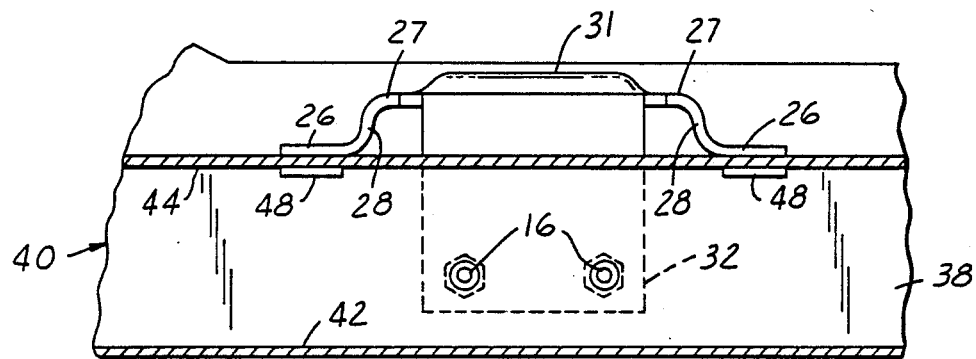
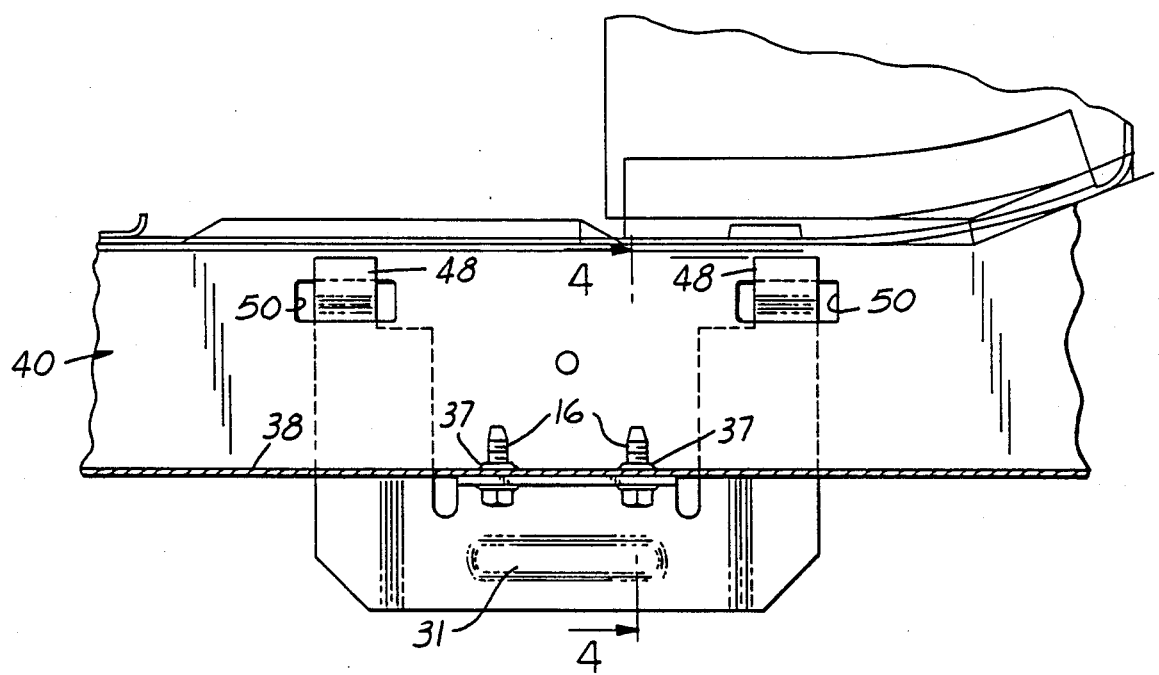

HOISTING AND TOWING BRACKET FOR VEHICLE

BACKGROUND OF THE INVENTION

This invention relates to lifting and towing apparatus for vehicles and more particularly to a rigid metal towing bracket adapted to be mounted on a front cross member of a vehicle frame.

The prior art is replete with various towing hitches or brackets adapted for mounting on vehicles. An example of one type of hitch bracket is found in the U.S. Pat. No. 4,620,736 issued Nov. 4, 1986, to T. L. Shanks which discloses an adaptor plate for attaching an accessory such as a trailer hitch or winch to the bumper of a vehicle. The plate includes an accessory mount or a wedge insert insertable into a mounting frame or bracket. A tongue and groove assembly cooperates between the bracket and accessory mount for holding the accessory mount in position.

The U.S. Pat. No. 2,380,523 issued July 31, 1945 to H. A. Hicks, et al. discloses a vehicle body structure showing a reinforcing member having a pair of longitudinally spaced flanges welded to floor portions of the body. The flanges are stepped to dispose successive flange portions so as to underlie floor portions to which they are respectively welded.

SUMMARY OF THE INVENTION

It is an object of the present invention to provide a rigid hoisting and towing add-on bracket adapted for attachment to a cross member of a vehicle frame which attains optimum loading and energy absorbtion with a relatively lightweight structure which is simple in construction and which can be readily manufactured at low cost.

It is another object of the present invention to provide a rigid metal hoisting and towing bracket as set forth above which is easy to assemble on a vehicle during an assembly line operation by integral connection means being initially engagable so as to align attaching screws thereby avoiding time consuming connecting means such as welding.

It is still another object of the present invention to provide a hoisting and towing bracket as set forth above that may be mounted on various types of vehicle frame cross members.

These and other objects and features of the invention will become apparent to those skilled in the vehicle suspension arts upon reading the following detailed description with reference to the accompanying drawings in which:

BRIEF DESCRIPTION OF THE DRAWINGS

FIG. 5 is a fragmentary top view taken substantially on the line 5—5 of FIG. 4;

FIG. 6 is a fragmentary, vertical sectional view, partly in elevation, taken substantially on the line 6—6 of FIG. 4;

DESCRIPTION OF THE PREFERRED EMBODIMENT

Figure 1:
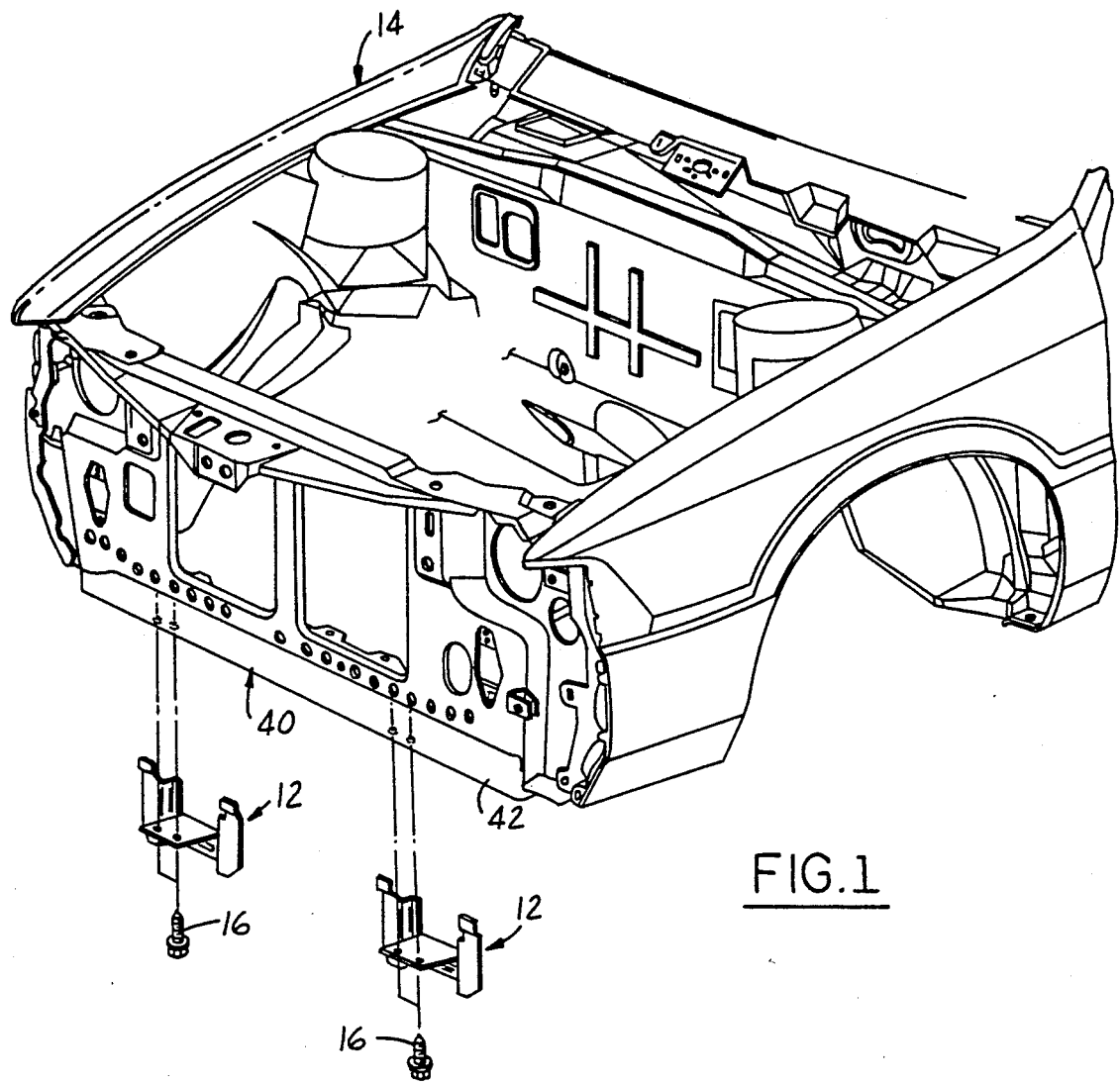
FIG. 1 is a partial exploded perspective view of a vehicle front end structure embodying brackets according to this invention.
Figure 2:
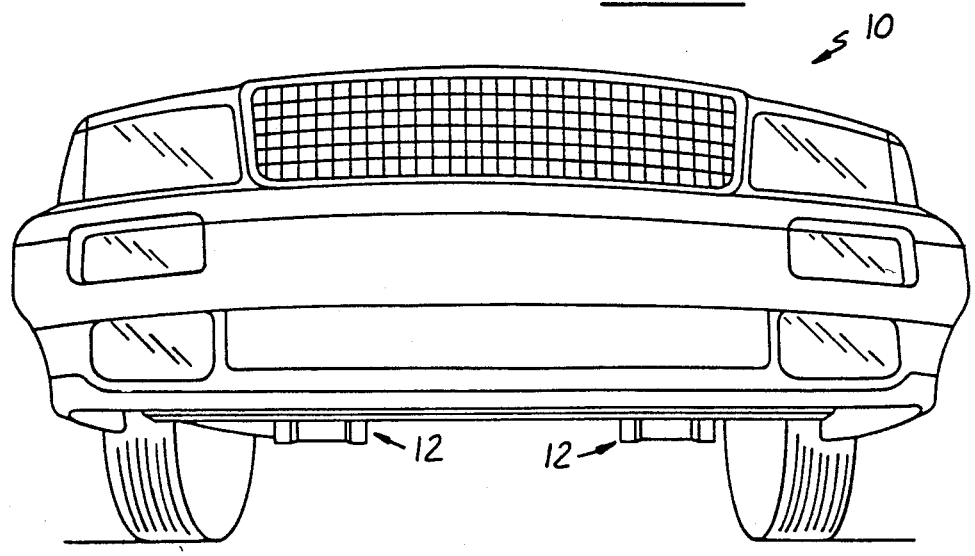
FIG. 2 is a front elevational view of an assembled vehicle front end showing the lower portions of a pair of the brackets in their installed positions.

Referring now to the drawings FIG. 2 shows a the front end portion of a vehicle 10 having a pair of identical metal hoisting and towing brackets 12 mounted on the underside thereof. FIG. 1 shows the body 14 of the vehicle with the pair of brackets 12 and their associated securing self-tapping screws 16 depicted in exploded pre-assembly fashion.

Figure 3:
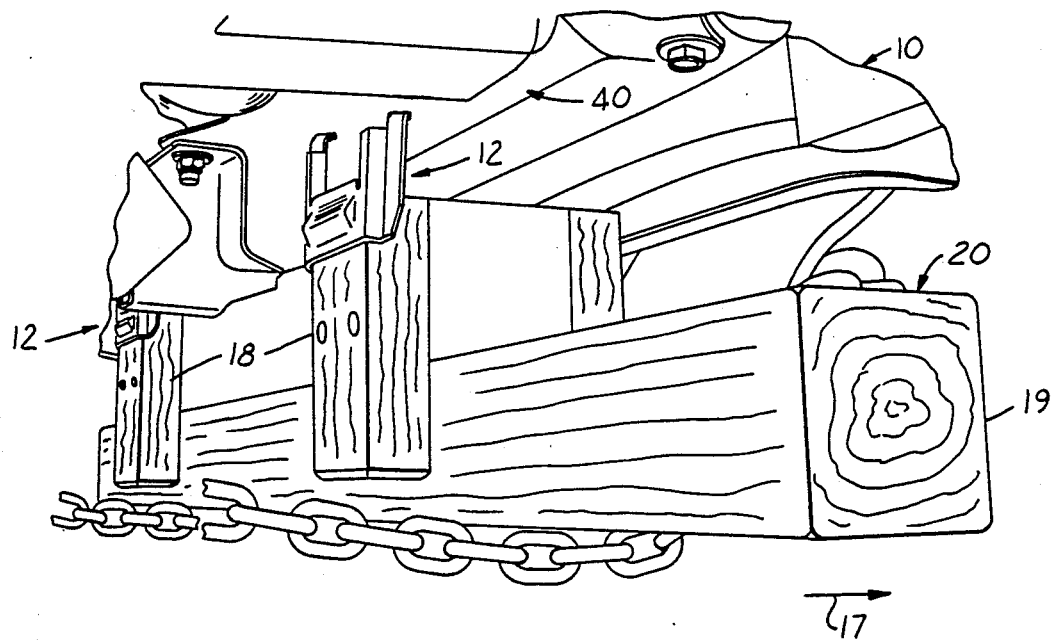
FIG. 3 is a fragmentary perspective view showing the underside of a vehicle front end with a tow truck lifting frame in engaged position with one of the brackets of the present invention.

With reference to FIG. 3 a portion of the underside of the vehicle 10 is shown with arrow 17 indicating the vehicles' forward end. The right hand bracket 12 is shown engaged by the upper end of vertical disposed square section wood spacer block 18 adapted for transverse slidable adjustment on a four-by-four cross beam 19 of a conventional hoisting and towing apparatus 20 adapted for mounting on the after body of a truck. One such a hoisting and towing apparatus is shown, for example, in U.S. Pat. No. 4,274,791 issued June 23, 1981 to Moon the disclosure of which is incorporated by reference herein.

Figure 7:
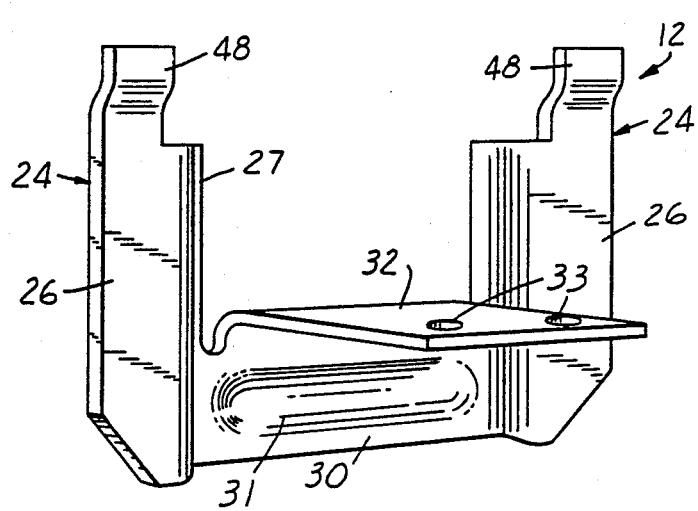
FIG. 7 is an enlarged perspective detail view of the bracket.
Figure 8:
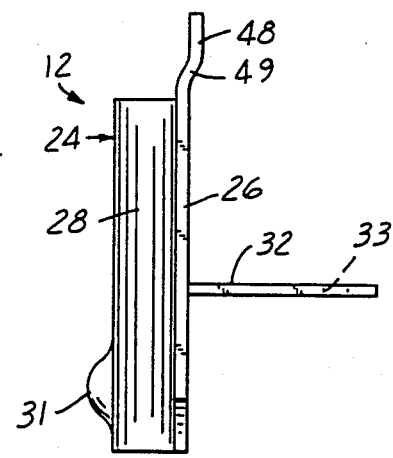
FIGS. 8, 9, and 10 are side, front, and top elevational detail views respectively, of the bracket.
Figure 9:
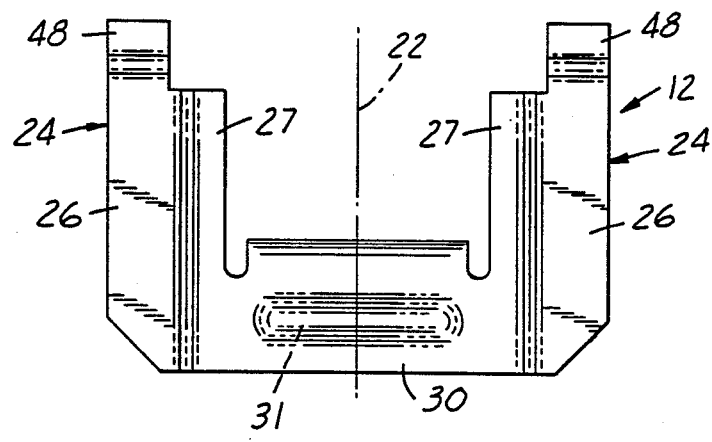

As best seen in FIGS. 7-10 each unitary sheet metal bracket is symmetrical about a vertically disposed longitudinally extending plane defined by dashed construction line 22 in FIG. 9. Each bracket 12 has a front elevation generally similar in shape to a figure "U" as shown in FIG. 9.

The U-shaped bracket is formed with first and second upright leg portions 24—24 having upper and lower ends.

Figure 10:
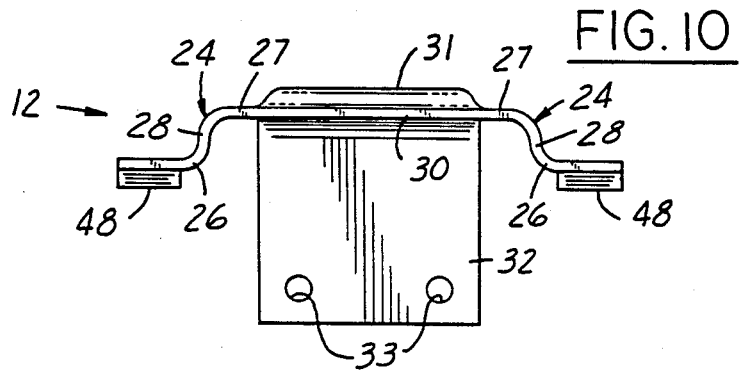

As depicted in FIG. 10, each leg portion 24 has a double L-shaped cross section defining outer 26 and inner 27 lateral flange portion interconnected by a longitudinal flange portion 28. The inner lateral flange portions 27—27 are shown in FIG. 10 in opposed spaced relation with their lower ends integrally joined by a transverse extending bridge portion 30. It will be noted that the bridge portion 30 is preferably formed with a rearwardly projecting oval-shaped bulge 31 to increase the stiffness and rigidity of the bracket 12.

FIGS. 7 and 8 show the bridge portion 30 having a forwardly extending, horizontally positioned plate portion 32 formed with a pair of attachment holes 33. As see in FIGS. 4 and 6, each of the holes 33 is adapted to receive a threaded hex head self-tapping threaded screw 16 therethrough for threaded reception in an aligned aperture 36 formed with a conical extension 37 in bottom wall 38 of a cross beam member generally indicated at 40. It will be noted in FIGS. 1, 4, and 6 that the cross member 40 is shown in the disclosed embodiment as a rectangular section channel-shaped cross beam having front 42 and rear 44 transverse side walls oriented at right angles to the bottom wall 38 and formed integral with body floor pan 46 of the vehicle 10. Thus, the bottom wall 38 and the rear wall 44 define a right angle juncture at radius 47.

It will be noted in FIGS. 7-9 that each leg portion outer flange 26 has its upper end terminating in a forwardly stepped offset flat upwardly projecting locking blade portion 48. FIG. 6 shows each locking blade 48 joined to its associated leg outer flange by means of an angled portion 49 such that the blade is offset from its outer flange by a predetermined amount substantially equal to the thickness of the bracket sheet metal material.

Figure 4:
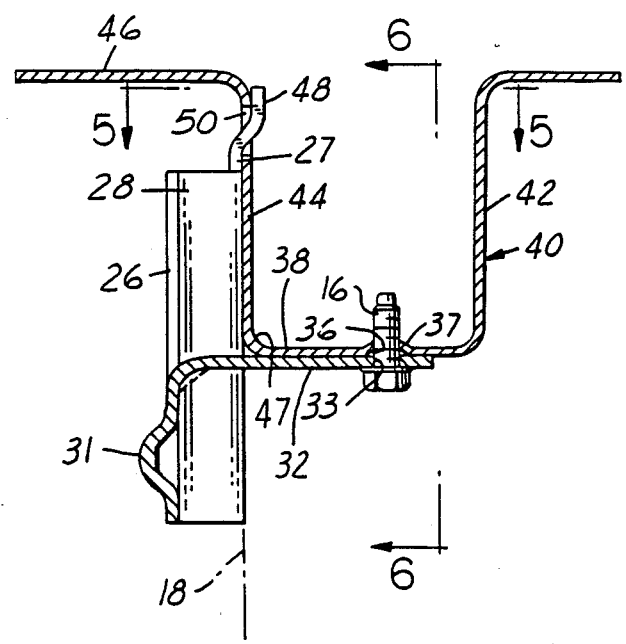
FIG. 4 is an enlarged fragmentary vertical sectional view of the bracket taken substantially on the line 4—4 of FIG. 6.

Referring to FIGS. 4, 5, and 6 the rear side wall 44 has a pair of elongate slots 50 formed therein which are initially engagable with an associated locking blade 48 of the bracket 12 prior to the attachment of the bolts 16. It will be appreciated that upon the engagement of the locking blades 48 in their associated slots 50 and the flush location of the upper surface of plate portion 32 with the undersurface of the cross member bottom wall 38 each bracket hole 33 is in alignment with its associated bottom wall aperture 36. Thus, the assembler is only required to threadably engage the two self-tapping screws 16 with a power screw driver to positively lock the bracket 12 on the vehicle cross member 40.

With reference to FIG. 4 the bridge portion 30 is shown protruding in a rearwardly offset manner a predetermined distance from a vertical plane that includes the rearward face of each leg member outer lateral flange 26. Further the bridge portion 30 has a predetermined transverse dimension defining, with the lower ends of each double-L-shaped leg portion, a niche or nesting pocket that is adapted to capture the upper end portion of the spacer block 18. It will be noted further that the combination of the rearwardly protruding bridge portion integral with the inner later flange portion 27 of the double-L-shaped leg portions increase the rigidity of the bracket.

It will be appreciated that the hex heads of the bolts 16 are shown in FIG. 4 projecting downwardly into their associated niche. In use, the screw heads engage and penetrate or "dig-into" the upper end of their associated wooden spacer block 18 thereby assisting in the capture of the block during the hoisting and towing operation.

While a preferred embodiment has been shown and described to illustrate the invention, other embodiments will become to those skilled in the art. Accordingly, the scope of his invention is set forth in the following claims.

What is claimed is:

1. A one-piece hoisting and towing bracket for mounting on a vehicle body transversely extending cross member having a horizontal bottom wall and a vertical side wall defining a right-angle juncture, wherein the bracket comprising:
   a U-shaped unitary sheet metal bracket symmetrical about a vertically disposed longitudinally extending plane, said bracket formed with a pair of upright leg portions having upper and lower ends such that their lower ends are integrally joined by a transverse extending bridge portion;
   said bridge portion having a forwardly extending, horizontally positioned plate portion formed with a plurality of holes, each said hole receiving a bolt therethrough and extending through an associated aligned aperture in said cross member bottom wall whereby said plate portion is attached in a flush manner with the undersurface of said bottom wall;
   a pair of horizontal slots in said cross beam member side wall, each said slot receiving an associated offset locking blade projecting upwardly from the upper end of each said leg portion thereby locating each said leg in flush contact with the rear face of said side wall and said plate portion upper face in flush contact with said bottom wall undersurface such that each plate portion hole is aligned with its associated bottom wall aperture;
   said bridge portion being rearwardly offset a predetermined distance from a vertical plane that includes the rearward face of each said leg members, and said bridge portion having a predetermined transverse dimension defining a niche such that, in use, said niche adapted to capture a post portion of a hoisting and towing apparatus enabling the vehicle to be readily engaged by the apparatus.

2. A one-piece hoisting and towing bracket for mounting on a vehicle body transversely extending cross member having a horizontal bottom wall and a vertical side wall defining a right-angle juncture, wherein the bracket comprising:
   a U-shaped unitary sheet metal bracket symmetrical about a vertically disposed longitudinally extending plane, said bracket formed with a pair of upright leg portions having upper and lower ends, each said leg having a double-L-shaped horizontal cross section defining a lateral flange portion interconnecting outer and inner longitudinal flange portions, said inner flange portions in opposed spaced relation such that their lower ends are integrally joined by a transverse extending bridge portion;
   said bridge portion having a forwardly extending, horizontally positioned plate portion formed with a plurality of holes, each said hole receiving a bolt therethrough and extending through an associated aligned aperture in said cross member bottom wall whereby said plate portion is attached in a flush manner with the undersurface of said bottom wall;
   each said upright leg portion lateral flange having a front side facing forwardly of said vehicle and a rear side, each said leg outer lateral flange upper end terminating in a forwardly offset flat upwardly projecting locking blade;
   a pair of horizontal slots in said cross beam member side wall, each said slot receiving its associated offset locking blade thereby locating each said leg front surface in flush contact with the rear face of said side wall and said plate portion upper face in flush contact with said bottom wall undersurface such that each plate portion hole is aligned with its associated bottom wall aperture;
   said bridge portion being rearwardly offset a predetermined distance from a vertical plane that includes the rearward face of said leg members outer lateral flange front face, and said bridge portion having a predetermined transverse dimension defining a niche such that, in use, said niche adapted to capture an upper end portion of a rectangular-section block portion of a hoisting and towing apparatus enabling the vehicle to be readily engaged by the apparatus.

* * * * *